(12) United States Patent
Hara

(10) Patent No.: US 7,130,142 B2
(45) Date of Patent: Oct. 31, 2006

(54) MAGNETIC DISK APPARATUS, METHOD OF CONTROLLING A MAGNETIC DISK, AND PROGRAM FOR CONTROLLING A MAGNETIC DISK

(75) Inventor: Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 10/991,070

(22) Filed: Nov. 17, 2004

(65) Prior Publication Data

US 2006/0001997 A1 Jan. 5, 2006

(30) Foreign Application Priority Data

Jul. 5, 2004 (JP) .............. 2004-197510

(51) Int. Cl.
*G11B 15/04* (2006.01)
*G11B 19/04* (2006.01)

(52) U.S. Cl. .................. 360/60; 360/75; 360/78.04

(58) Field of Classification Search ............ None
See application file for complete search history.

(56) References Cited

U.S. PATENT DOCUMENTS

| 4,803,572 | A | * | 2/1989 | Haruna et al. ............ 360/60 |
| 5,270,880 | A | * | 12/1993 | Ottesen et al. ............ 360/60 |
| 5,570,244 | A | * | 10/1996 | Wiselogel ................. 360/60 |
| 5,694,265 | A | * | 12/1997 | Kosugi et al. ........... 360/77.05 |
| 5,986,845 | A | * | 11/1999 | Yamaguchi et al. ......... 360/75 |
| 6,018,435 | A | * | 1/2000 | Uno et al. ............... 360/78.14 |
| 6,496,315 | B1 | * | 12/2002 | Ueda et al. .............. 360/60 |
| 6,597,532 | B1 | * | 7/2003 | Usui et al. ............. 360/97.03 |
| 6,650,499 | B1 | | 11/2003 | Kusumoto |
| 6,728,061 | B1 | * | 4/2004 | Takaishi ............... 360/78.07 |
| 6,879,460 | B1 | * | 4/2005 | Tomiyama et al. ...... 360/77.04 |
| 6,989,957 | B1 | * | 1/2006 | Hamada et al. ......... 360/78.04 |
| 6,995,945 | B1 | * | 2/2006 | Kohso et al. ........... 360/78.06 |
| 7,002,766 | B1 | * | 2/2006 | Kisaka et al. ............ 360/60 |
| 2002/0126412 | A1 | | 9/2002 | Shibata |
| 2004/0042114 | A1 | | 3/2004 | Kusumoto |
| 2004/0190188 | A1 | * | 9/2004 | Zaitsu .................. 360/77.02 |
| 2005/0190480 | A1 | * | 9/2005 | Mori et al. ............. 360/60 |

FOREIGN PATENT DOCUMENTS

EP 516854 A1 * 12/1992

* cited by examiner

*Primary Examiner*—Wayne Young
*Assistant Examiner*—Dismery Mercedes
(74) *Attorney, Agent, or Firm*—Greer, Burns & Crain, Ltd.

(57) ABSTRACT

A magnetic disk apparatus comprising a magnetic disk 1, a head, a servo-information detecting unit 3, a servo-information position calculating unit 4, a write-permission determining unit 15, a data-writing unit 6, and a head-drive control unit 17. Servo information and data are recorded on the disk 1. The head reads and writes data from and on the magnetic disk 1. The servo-information detecting unit 3 detects a present head position from a signal supplied from the head. The write-permission determining unit 15 calculates a present head speed and a present head acceleration from the present head position and a previous head position detected in the past, and determines whether data can be written, from the present head position, the present head speed and the present head acceleration. The data-writing unit 6 writes data in accordance with a decision made by the write-permission determining unit 15. The head-drive control unit 17 drives the head in accordance with the present head position.

18 Claims, 5 Drawing Sheets

MAGNETIC DISK APPARATUS, METHOD OF CONTROLLING A MAGNETIC DISK, AND PROGRAM FOR CONTROLLING A MAGNETIC DISK

BACKGROUND OF THE INVENTION

1. Field of the Invention

The present invention relates to a magnetic disk apparatus, a method of controlling a magnetic disk, and a program for controlling a magnetic disk, all designed to enhance the efficiency of writing data on a magnetic disk.

2. Description of the Related Art

First, a conventional magnetic disk apparatus will be described. FIG. 5 is a block diagram illustrating the configuration of the conventional magnetic disk apparatus. As FIG. 5 shows, this magnetic disk apparatus comprises a magnetic disk 1, a read head 2, a servo-information detecting unit 3, a servo-information position calculating unit 4, a write-permission determining unit 5, a head-drive control unit 7, a data-writing unit 6, an actuator 8 and a write head 9.

Servo information and data are recorded on the magnetic disk 1. Located above the magnetic disk 1, the read head 2 reads signals from the disk 1. The signals are output to the servo-information detecting unit 3. The servo-information detecting unit 3 detects the servo information from these signals from the read head 2 and outputs the servo information to the servo-information position calculating unit 4. The servo-information position calculating unit 4 acquires from the servo information a PES (Position Error Signal), which represents the position that the head assumes at present. The PES is output to the write-permission determining unit 5 and the head-drive control unit 7. The write-permission determining unit 5 determines whether the data-writing should be prohibited or not, on the basis of the position at which the head is located at present and the speed at which the head is moving. The data representing the decision made is output to the data-writing unit 6. In accordance with this data, the data-writing unit 6 performs a data-writing operation. Meanwhile, the head-drive control unit 7 controls a current so that the PES becomes 0 (zero) before it is supplied to the actuator 8 that drives both the read head 2 and the write head 9.

It will be explained how the write-permission determining unit 5 determines whether the data-writing should be prohibited or not. The write-permission determining unit 5 finds the speed of the head, p(n)–p(n–1), from the previous head position p(n–1) and the present head position p(n) obtained from the servo information position calculating unit 4. Further, the unit 5 infers the position p(n+1)=p(n)+(p(n)–p(n–1)) that the head will take next, from the present head position and the present head speed. If the present head position and the next head position inferred fall within a predetermined write-prohibiting slice, the unit 5 outputs a write-permission signal to the data-writing unit 6. Otherwise, the write-permission determining unit 5 outputs a write-prohibition signal to the data-writing unit 6.

Once the data-writing unit 6 has received the write-prohibition signal, no data is written until a prescribed condition is satisfied. The prescribed condition is, for example, the receipt of three consecutive write-permission signals.

The retry operation that the head-drive control unit 7 performs will be explained. If the write head 9 fails to write data on the disk 1, the unit 7 makes the write head 9 try to write the data several times. Every time the write head 9 tries to write data, the head-drive control unit 7 changes servo-related parameters. For example, the unit 7 decreases the servo band to prevent a data-writing failure that may otherwise occur when the servo control is performed to cancel data disruption that takes places while the STW (Servo Track Writer) is carrying out discontinuous data-writing.

In the conventional magnetic disk apparatus, however, the determination whether the data can be written is conducted in accordance with only the position of the head and the speed of the head. Since the head moves very fast from one position to another, it may write data not on the target track, but on the track adjacent to the target track. Further, the data-writing performance is extremely low, because no data is written until a prescribed condition is satisfied, once data-writing unit 6 has received a write-prohibition signal. Furthermore, if the heads 2 and 9 vibrate and the head-drive control unit 7 therefore performs an retry operation, no measures cannot be taken to compensate the vibration during the retry operation.

SUMMARY OF THE INVENTION

The present invention has been made to solve the problems described above. An object of this invention is to provide a magnetic disk apparatus, a method of controlling a magnetic disk and a program for controlling a magnetic disk, which can avoid data-writing on an adjacent track in spite of disturbance such as vibration and which can prevent a decrease in the data-writing performance.

To attain the object mentioned above, a magnetic disk apparatus according to this invention comprises: a head that reads and writes data from and on a magnetic disk; a servo-information detecting unit that detects a present head position from a signal supplied from the head; a write-permission determining unit that calculates a present head speed and a present head acceleration from the present head position and a previous head position detected in the past, and determines whether data can be written, from the present head position, a present head speed and a present head acceleration; a data-writing unit that writes data in accordance with a decision made by the write-permission determining unit; and a head-driving unit that drives the head in accordance with the present head position.

In the magnetic disk apparatus according to the invention, the write-permission determining unit may calculate the present head speed and the present head acceleration from the present head position, the last head position and the penultimate head position, may add the present head position, present head speed and present head acceleration, thereby inferring a next head position, may determine that data-writing is permitted, when the present head position and the next head position fall within a predetermined write-prohibiting slice, and may determine that the data-writing is prohibited, when the present head position and the next head position fall outside the predetermined write-prohibiting slice.

In the magnetic disk apparatus according to the invention, the write-permission determining unit may decrease the write-prohibiting slice while the data-writing is prohibited.

In the magnetic disk apparatus according to this invention, the head-driving unit may increase a servo band and some other parameters to perform a retry operation when the data-writing fails.

Anther magnetic disk apparatus according to the present invention comprises: a head that reads and writes data from and on a magnetic disk; a servo-information detecting unit that detects a present head position from a signal supplied from the head; a write-permission determining unit that infers a next head position from a present head position and a previous head position detected in the past, and determines that data-writing is permitted, when the present head position and the next head position fall within a predetermined write-prohibiting slice, determines that the data-writing is prohibited, when the present head position and the next head position fall outside the predetermined write-prohibiting slice, and decreases the write-prohibiting slice while the data-writing is prohibited; a data-writing unit that writes data in accordance with a decision made by the write-permission determining unit; and a head-driving unit that drives the head in accordance with the present head position.

In this magnetic disk apparatus, the head-driving unit increases a servo band and some other parameters to perform a retry operation when the data-writing fails.

Still another magnetic disk apparatus according to the present invention comprises: a head that reads and writes data from and on a magnetic disk; a servo-information detecting unit that detects a present head position from a signal supplied from the head; a write-permission determining unit that infers a next head position from a present head position and a previous head position detected in the past, determines that data-writing is permitted, when the present head position and the next head position fall within a predetermined write-prohibiting slice, and determines that the data-writing is prohibited, when the present head position and the next head position fall outside the predetermined write-prohibiting slice; a data-writing unit that writes data in accordance with a decision made by the write-permission determining unit; and a head-driving unit that drives the head in accordance with the present head position and increases or decreases a servo band to perform a retry operation when the data-writing fails.

A method of controlling a magnetic disk, according to the present invention, comprises: a reading step of reading servo information; a servo-information detecting step of detecting a present head position from a signal generated in the reading step; a write-permission determining step of calculating a present head speed and a present head acceleration from the present head position and a previous head position detected in the past, and determines whether data can be written, from the present head position, a present head speed and a present head acceleration; a data-writing step of writing data in accordance with a decision made in the write-permission determining step; and a head-driving step of driving the head in accordance with the present head position.

In the method of controlling a magnetic disk, according to the present invention, in the write-permission determining step, the present head speed and the present head acceleration are calculated from the present head position, the last head position and the penultimate head position, the present head position, present head speed and present head acceleration are added, thereby inferring a next head position, it is determined that data-writing is permitted, when the present head position and the next head position fall within a predetermined write-prohibiting slice, and it is determined that the data-writing is prohibited, when the present head position and the next head position fall outside the predetermined write-prohibiting slice.

In the method of controlling a magnetic disk, according to the invention, in the write-permission determining step, the write-prohibiting slice is decreased while the data-writing is prohibited.

In the method of controlling a magnetic disk, according to the invention, in the head-driving step, a servo band and some other parameters are increased to perform a retry operation when the data-writing fails.

According to another method of controlling a magnetic disk, according to the present invention, comprises: a reading step of reading servo information; a servo-information detecting step of detecting a present head position from a signal generated in the reading step; a write-permission determining step of inferring a next head position from a present head position and a previous head position detected in the past, determining that data-writing is permitted, when the present head position and the next head position fall within a predetermined write-prohibiting slice, determining that the data-writing is prohibited, when the present head position and the next head position fall outside the predetermined write-prohibiting slice, and decreasing the write-prohibiting slice while the data-writing is prohibited; a data-writing step of writing data in accordance with a decision made in the write-permission determining step; and a head-driving step of driving the head in accordance with the present head position.

In this method of controlling a magnetic disk, according to the invention, in the head-driving step, a servo band and some other parameters are increased to perform a retry operation when the data-writing fails.

Still another method of controlling a magnetic disk, according to the present invention, comprises: a reading step of reading servo information; a servo-information detecting step of detecting a present head position from a signal generated in the reading step; a write-permission determining step of inferring a next head position from a present head position and a previous head position detected in the past, and determining that data-writing is permitted, when the present head position and the next head position fall within a predetermined write-prohibiting slice, and determining that the data-writing is prohibited, when the present head position and the next head position fall outside the predetermined write-prohibiting slice; a data-writing step of writing data in accordance with a decision made in the write-permission determining step; and a head-driving step of driving the head in accordance with the present head position and increasing or decreasing a servo band to perform a retry operation when the data-writing fails.

This invention provides a program for controlling a magnetic disk designed to make a computer control a magnetic disk to write data when a prescribed condition is satisfied. The program describes: a reading step of reading servo information; a servo-information detecting step of detecting a present head position from a signal generated in the reading step; a write-permission determining step of calculating a present head speed and a present head acceleration from the present head position and a previous head position detected in the past, and determining whether data can be written, from the present head position, a present head speed and a present head acceleration; a data-writing step of writing data in accordance with a decision made in the write-permission determining step; and a head-driving step of driving the head in accordance with the present head position.

In the program for controlling a magnetic disk, according to this invention, in the write-permission determining step, the present head speed and the present head acceleration are calculated from the present head position, the last head position and the penultimate head position, the present head position, present head speed and present head acceleration are added, thereby inferring a next head position, it is determined that data-writing is permitted, when the present head position and the next head position fall within a predetermined write-prohibiting slice, and it is determined that the data-writing is prohibited, when the present head position and the next head position fall outside the predetermined write-prohibiting slice.

In the program for controlling a magnetic disk, according to this invention, in the write-permission determining step, the write-prohibiting slice is decreased while the data-writing is prohibited.

In the program for controlling a magnetic disk, according to the invention, in the head-driving step, a servo band and some other parameters are increased to perform a retry operation when the data-writing fails.

The present invention provides another program for controlling a magnetic disk designed to make a computer control a magnetic disk to write data when a prescribed condition is satisfied. This program describes: a reading step of reading servo information; a servo-information detecting step of detecting a present head position from a signal generated in the reading step; a write-permission determining step of inferring a next head position from a present head position and a previous head position detected in the past, determining that data-writing is permitted, when the present head position and the next head position fall within a predetermined write-prohibiting slice, determining that the data-writing is prohibited, when the present head position and the next head position fall outside the predetermined write-prohibiting slice, and decreasing the write-prohibiting slice while the data-writing is prohibited; a data-writing step of writing data in accordance with a decision made in the write-permission determining step; and a head-driving step of driving the head in accordance with the present head position.

In this program for controlling a magnetic disk, according to the invention, in the head-driving step, a servo band and some other parameters are increased to perform a retry operation when the data-writing fails.

This invention provides still another program for controlling a magnetic disk designed to make a computer control a magnetic disk to write data when a prescribed condition is satisfied. This program describes: a reading step of reading servo information; a servo-information detecting step of detecting a present head position from a signal generated in the reading step; a write-permission determining step of inferring a next head position from a present head position and a previous head position detected in the past, determining that data-writing is permitted, when the present head position and the next head position fall within a predetermined write-prohibiting slice, and determining that the data-writing is prohibited, when the present head position and the next head position fall outside the predetermined write-prohibiting slice; a data-writing step of writing data in accordance with a decision made in the write-permission determining step; and a head-driving step of driving the head in accordance with the present head position and increasing or decreasing a servo band to perform a retry operation when the data-writing fails.

The head comprises a read head and a write head in the following embodiment of the invention. The servo-information detecting unit comprises a servo-information detecting unit and a servo-information position calculating unit in the embodiment. The head-driving unit comprises an actuator and a head-drive control unit. Each of the programs for controlling a magnetic disk, according to the present invention, can be recorded in a computer-readable recording medium. The computer-readable recording medium is a portable recording medium such as a CD-ROM, a flexible disk, a DVD disk, a magneto optical disk or an IC card, a data storage unit that holds computer programs, another computer, the data storage unit incorporated in the other computer, or a data-transmitting medium provided on a line.

In the present invention, if the head acceleration is high, the next head position is calculated in consideration of the head acceleration. This reduces the risk that the head writes data on a track adjacent to the target track. If the head acceleration is low, the next head position is calculated from the present head position and the head speed. The speed of calculation therefore increases to cope with any abrupt changes. Further, the write-prohibiting slice is broadened while the data-writing is prohibited, and the data-writing is permitted if the head position falls within the broad write-prohibiting slice. Thus, the data-writing efficiency will not excessively decrease in spite of the write-prohibiting period. Moreover, the servo band is increased and the other parameters are changed, in any retry operation. This helps to avoid data-writing on an adjacent track, in spite of vibration.

DETAILED DESCRIPTION OF THE PREFERRED EMBODIMENTS

An embodiment of the present invention will be described, with reference to the accompanying drawings.

Figure 1:
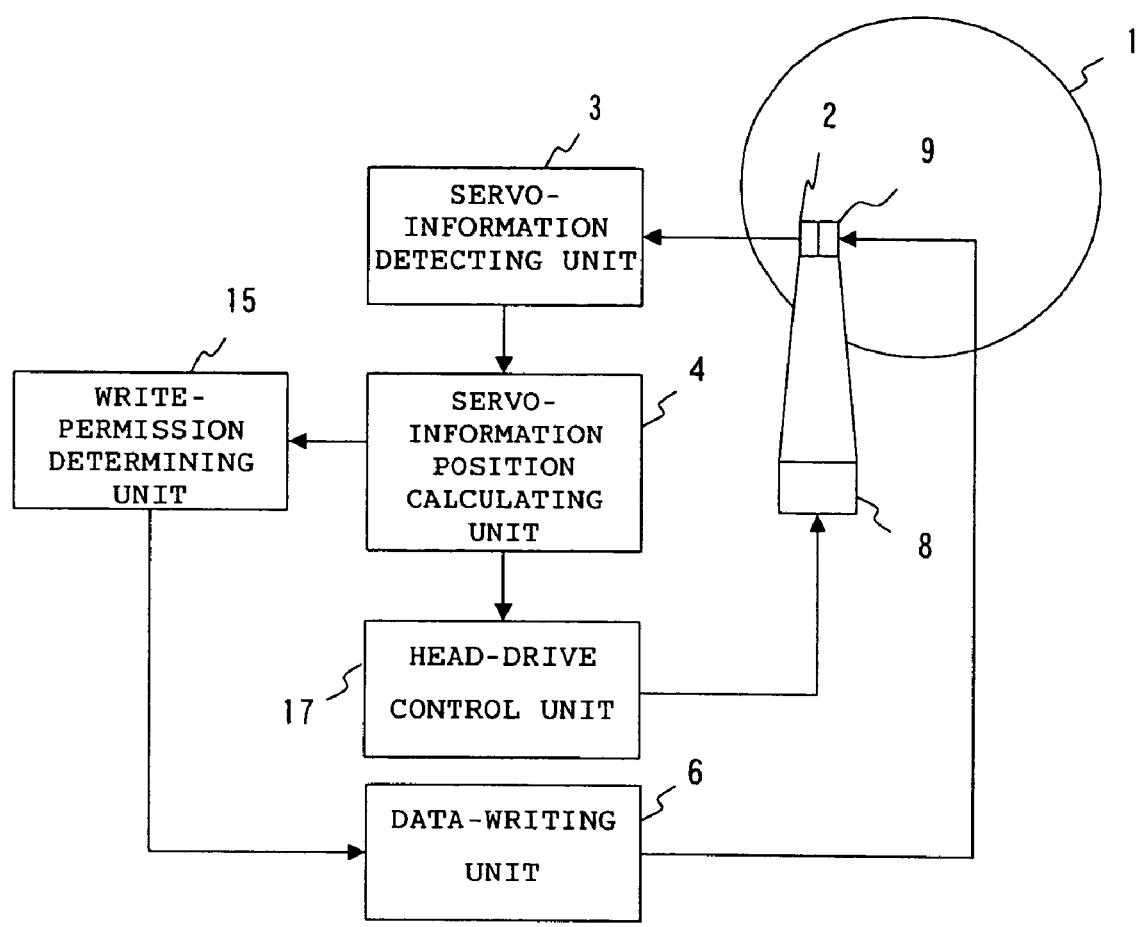
FIG. 1 is a block diagram showing the configuration of a magnetic disk apparatus according to an embodiment of the present invention.
Figure 5:
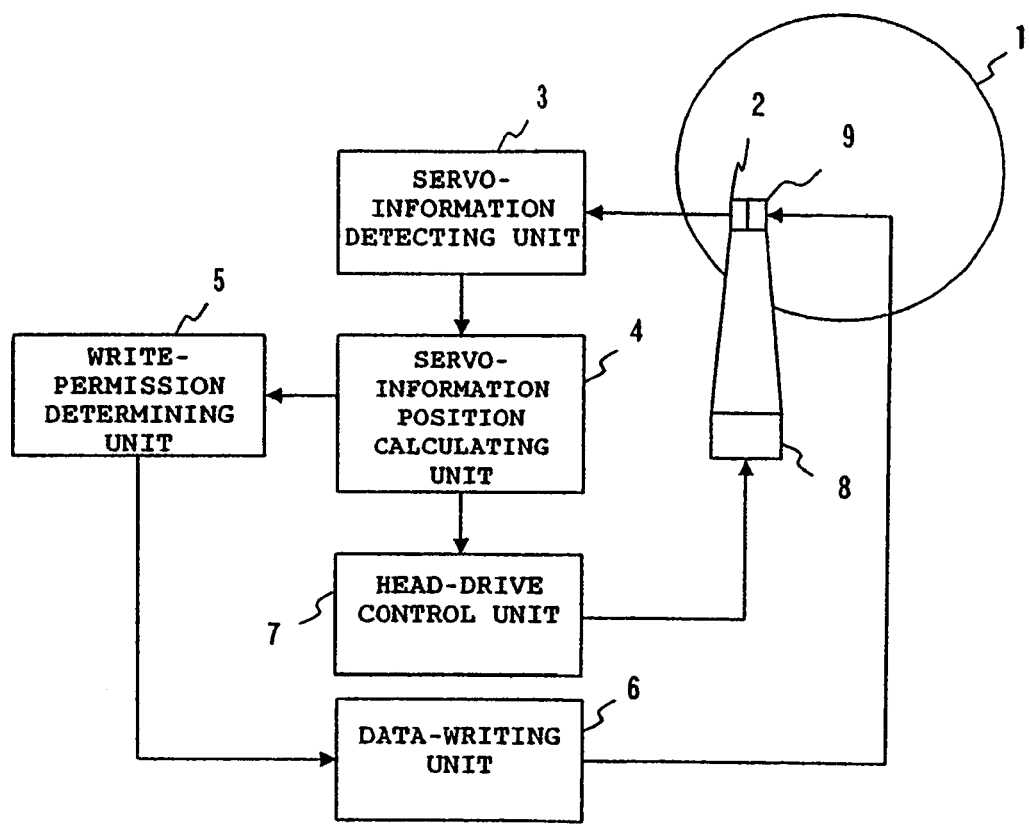
FIG. 5 is a block diagram showing the configuration of a conventional magnetic disk apparatus.

A magnetic disk apparatus that is an embodiment of the present invention will be described. FIG. 1 is a block diagram showing the configuration of the magnetic disk apparatus according to this embodiment. The components that are identical or equivalent to those shown in FIG. 5 are designated at the same reference numerals in FIG. 1 and will not be described in detail. The magnetic disk apparatus of FIG. 1 differs from the configuration of FIG. 5 in that a write-permission determining unit 15 and a head-drive control unit 17 are provided in place of the write-permission determining unit 5 and the head-drive control unit 7, respectively.

Figure 2:
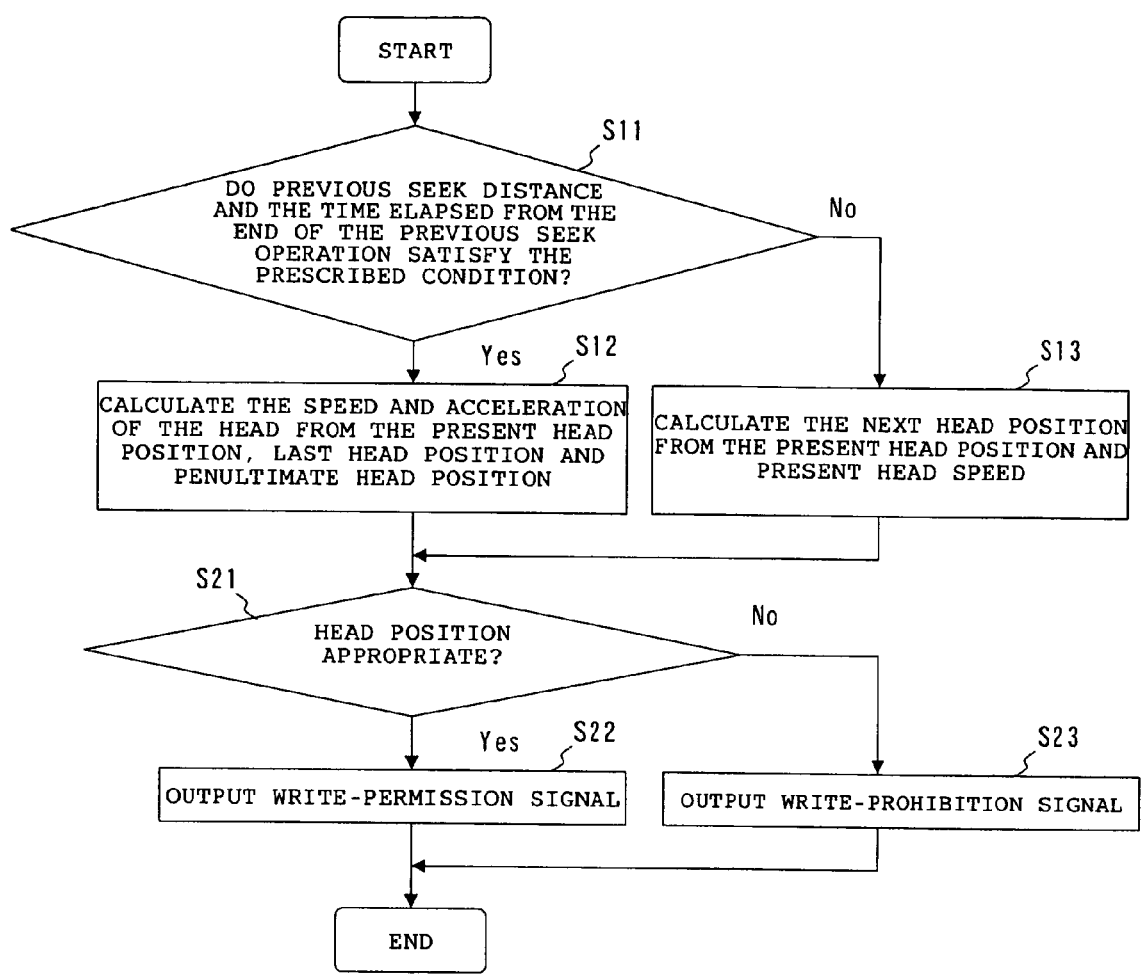
FIG. 2 is a flowchart explaining how the write-permission determining unit performs its function in the magnetic disk apparatus.

It will be explained how the write-permission determining unit 15 performs its function. FIG. 2 is a flowchart explaining how the unit 15 determines whether a data-writing operation is permitted or not. First, the write-permission determining unit 15 determines whether the distance of the previous seek operation and the time elapsed from the completion of the previous seek operation satisfy a prescribed condition (Step S11). The prescribed condition is, for example, that the acceleration increases until the settling after the seek operation ends. More precisely, the distance of the previous seek operation should be, for example, 100 h (h is a hexadecimal number), and the time elapsed from the completion of the previous seek operation should be, for example, 28 ms or less.

If the distance of the previous seek operation and the time elapsed from the completion of the previous seek operation satisfy the prescribed condition (if YES in Step S11) next head position is calculated from the present head position, the present head speed and the present head acceleration (Step S12). Then, the operation goes to Step S12. In Step S21, the speed p(n)−p(n−1) and acceleration p(n)−2p(n−1)+p(n−2) of the present head are calculated from the present head position p(n), the last head position p(n−1) and the penultimate head position p(n−2). Then, the next head position, p(n+1)=p(n)+(p(n)−p(n−1)+(p(n)−2p(n−1)+p(n−2), is inferred from the present head position, the present head speed and the present head acceleration.

The distance of the previous seek operation and the time elapsed from the completion of the previous seek operation may not satisfy the prescribed condition (NO in Step S11). In this case, the next head position is calculated from the present head position and the present head speed (Step S13). Then, the operation goes to Step S21. In other words, the present head speed p(n)−p(n−1) is calculated from the previous head position p(n−1) and the present head position p(n), and the next head position p(n+1)=p(n)+(p(n)−p(n−1), is then inferred from the present head position and the present head speed.

Next, the write-permission determining unit 15 determines whether the head position is appropriate or not (Step S21). More precisely, the unit 15 determines that the head position is appropriate (YES in Step S21), if the present head position and the next head position inferred fall within a predetermined write-prohibiting slice. The unit 15 outputs a write-permission signal to the data-writing unit 6 (Step S22). Then, this sequence is terminated. If the head position is not appropriate (NO in Step S21), the write-permission determining unit 15 outputs a write-prohibition signal to the data-writing unit 6 (Step S23). Thus, the sequence of determining whether data can be written is terminated.

In determining whether data can be written is terminated, the head acceleration is taken into account to calculate the next head position if the head acceleration is high. This reduces the possibility of writing data on the track adjacent to the target track. If the head acceleration is low, the next head position is calculated from the present head position and the present head speed. Hence, the speed of calculation increases to cope with any abrupt changes.

Figure 3:
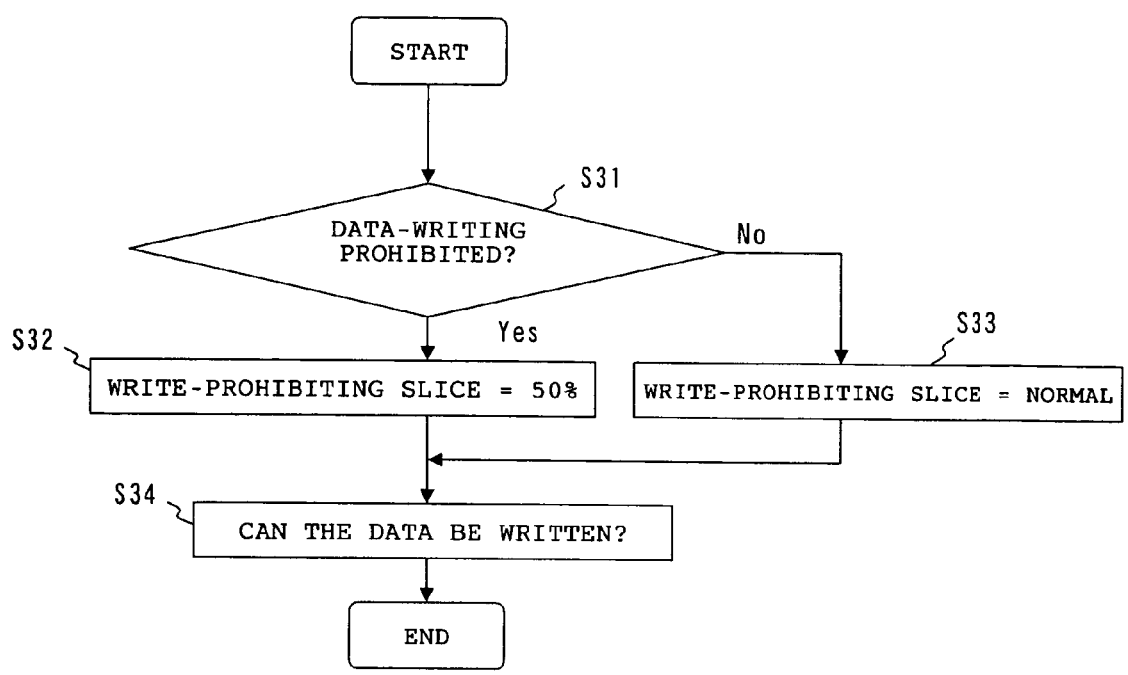
FIG. 3 is a flowchart explaining how the write-permission determining unit determines a write-prohibiting slice.

It will be described how the write-permission determining unit 15 determines the write-prohibiting slice. FIG. 3 is a flowchart explaining how the unit 15 operates to determine the write-prohibiting slice. First, the write-permission determining unit 15 determines whether the data-writing is prohibited or not (Step S31). If the data-writing is not prohibited (if NO in Step S31), the unit 15 sets the write-prohibiting slice to the normal value (Step S33). Then, the operation goes to Step S34. If the data-writing is prohibited (if YES in Step S31), the unit 15 sets the write-prohibiting slice to 50% of the normal value (Step S32). Then, the operation goes to Step S34. In Step S34, the unit 15 determines whether data can be written or not, as has been described above. The sequence of determining the write-prohibiting slice is then terminated.

In the sequence of determining the write-prohibiting slice described above, the write-prohibiting slice is broadened while the data-writing is prohibited. Then, if the head position falls within the broad write-prohibiting slice, the data-writing will be permitted. Thus, the data-writing efficiency will not excessively decrease in spite of the write-prohibiting period.

Figure 4:
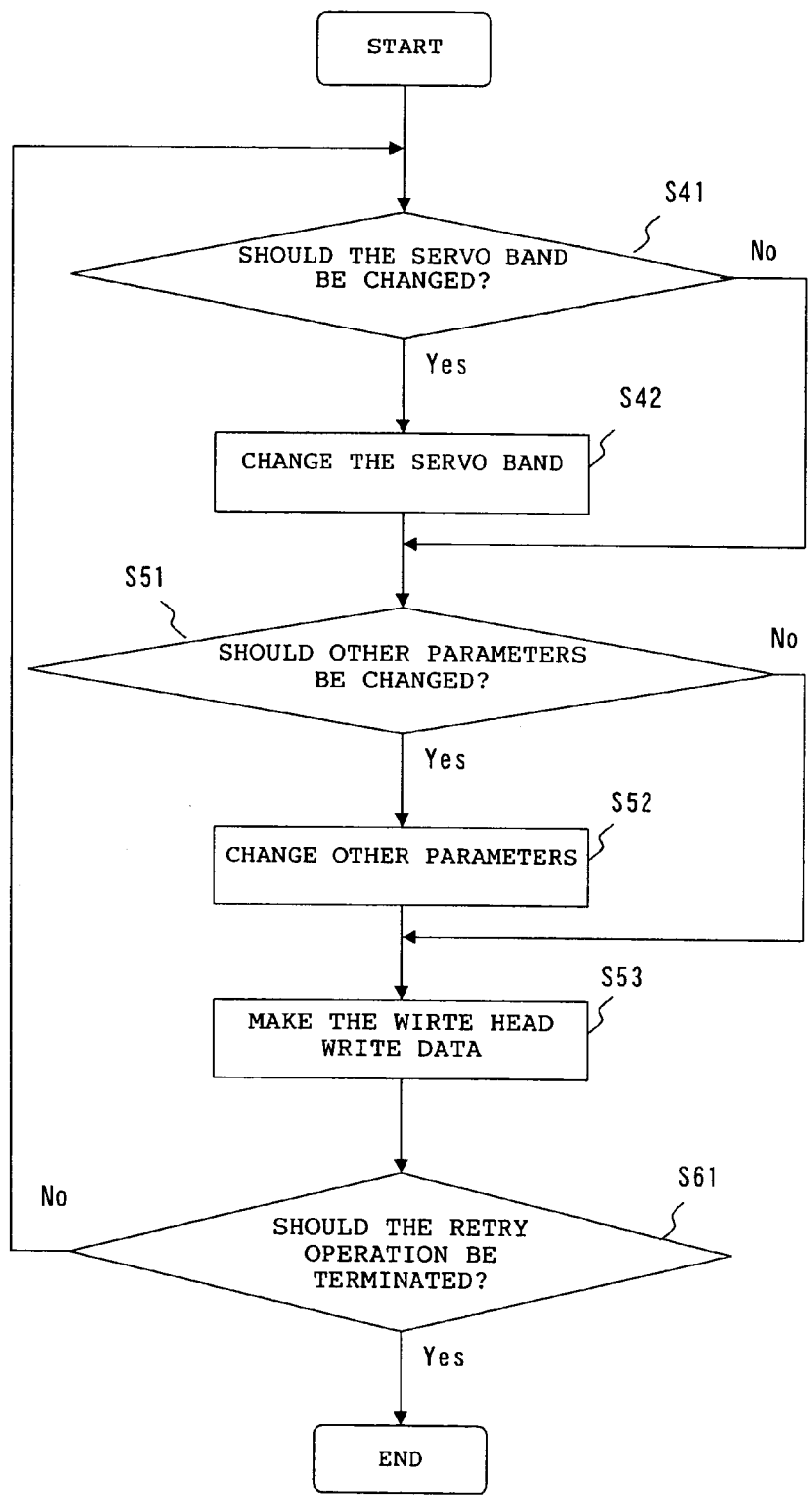
FIG. 4 is a flowchart explaining how the head-drive control unit operates during an retry operation.

How the head-drive control unit 17 operates during an retry operation will be explained. FIG. 4 is a flowchart explaining how the unit 17 operates during the retry operation. When the retry operation is started, the head-drive control unit 17 determines whether the servo band should be changed or not (Step S41). If the unit 17 determines that the servo band need not be changed (if NO in Step S41), the operation goes to Step S51. If the unit 17 determines that the servo band must be changed (if YES in Step S41), the operation goes to Step S42. In Step S42, the unit 17 changes the servo band. Then, the operation goes to Step S51. In Step S42, the servo band may be not only decreased as in the conventional magnetic disk apparatus, but also increased.

Next, the head-drive control unit 17 determines whether the parameters concerning the data-writing, other than the servo band, should be changed or not (Step S51). If the other parameters need not be changed (if NO in Step S51), the operation goes to Step S53. If other parameters must be changed (if YES in Step S51), the operation goes to Step S52. In Step S52, the other parameters are changed, and the operation goes to Step S53. In Step S53, the head-drive control unit 17 tries to make the write head 9 write data. Then, the unit 17 determines whether the retry operation should be terminated or not (Step S61). If the retry operation need not be terminated (if NO in Step S61), the operation returns to Step S41. If the retry operation should be terminated (if YES in Step S61), the sequence of steps shown in FIG. 4 is terminated.

In the retry operation, the servo band may be increased and the other parameters are changed. This helps to avoid data-writing on an adjacent track in spite of vibration.

What is claimed is:

1. A magnetic disk apparatus comprising:
a head that reads and writes data from and on a magnetic disk;
a servo-information detecting unit that detects a present head position from a signal supplied from the head;
a write-permission determining unit that calculates a present head speed and a present head acceleration from the present head position and a previous head position detected in the past, and determines whether data can be written, from the present head position, a present head speed and a present head acceleration;
a data-writing unit that writes data in accordance with a decision made by the write-permission determining unit; and
a head-driving unit that drives the head in accordance with the present head position,
wherein the write-permission determining unit calculates the present head speed and the present head acceleration from the present head position, the last head position and the penultimate head position factors in the present head position, present head speed and present head acceleration, thereby inferring a next head position, determines that data-writing is permitted, when the present head position and the next head position fall within a predetermined write-prohibiting slice, and determines that the data-writing is prohibited, when the present head position and the next head position fall outside the predetermined write-prohibiting slice.

2. The magnetic disk apparatus according to claim 1, wherein the write-permission determining unit decreases the write-prohibiting slice while the data-writing is prohibited.

3. The magnetic disk apparatus according to claim 1, wherein the head-driving unit increases a servo band and some other parameters to perform a retry operation when the data-writing fails.

4. A magnetic disk apparatus comprising:
a head that reads and writes data from and on a magnetic disk;
a servo-information detecting unit that detects a present head position from a signal supplied from the head;
a write-permission determining unit that infers a next head position from a present head position and a previous head position detected in the past, determines that data-writing is permitted, when the present head position and the next head position fall within a predetermined write-prohibiting slice, determines that the data-writing is prohibited, when the present head position and the next head position fall outside the predetermined write-prohibiting slice, and decreases the write-prohibiting slice while the data-writing is prohibited;
a data-writing unit that writes data in accordance with a decision made by the write-permission determining unit; and
a head-driving unit that drives the head in accordance with the present head position.

5. The magnetic disk apparatus according to claim 4, wherein the head-driving unit increases a servo band and some other parameters to perform a retry operation when the data-writing fails.

6. A magnetic disk apparatus comprising:
a head that reads and writes data from and on a magnetic disk;
a servo-information detecting unit that detects a present head position from a signal supplied from the head;
a write-permission determining unit that infers a next head position from a present head position and a previous head position detected in the past, determines that data-writing is permitted, when the present head position and the next head position fall within a predetermined write-prohibiting slice, and determines that the data-writing is prohibited, when the present head position and the next head position fall outside the predetermined write-prohibiting slice;
a data-writing unit that writes data in accordance with a decision made by the write-permission determining unit; and
a head-driving unit that drives the head in accordance with the present head position and increases or decreases a servo band to perform a retry operation when the data-writing fails.

7. A method of controlling a magnetic disk, comprising:
a reading step of reading servo information;
a servo-information detecting step of detecting a present head position from a signal generated in the reading step;
a write-permission determining step of calculating a present head speed and a present head acceleration from the present head position and a previous head position detected in the past, and determining whether data can be written, from the present head position, a present head speed and a present head acceleration;
a data-writing step of writing data in accordance with a decision made in the write-permission determining step; and
a head-driving step of driving the head in accordance with the present head positions,
wherein, in the write-permission determining step, the present head speed and the present head acceleration are calculated from the present head position, the last head position and the penultimate head position, the present head position, present head speed and present head acceleration are factored in, thereby inferring a next head position, it is determined that data-writing is permitted, when the present head position and the next head position fall within a predetermined write-prohibiting slice, and it is determined that the data-writing is prohibited, when the present head position and the next head position fall outside the predetermined write-prohibiting slice.

8. The method of controlling a magnetic disk, according to claim 7, wherein, in the write-permission determining step, the write-prohibiting slice is decreased while the data-writing is prohibited.

9. The method of controlling a magnetic disk, according to claim 7, wherein, in the head-driving step, a servo band and some other parameters are increased to perform a retry operation when the data-writing fails.

10. A method of controlling a magnetic disk, comprising:
a reading step of reading servo information;
a servo-information detecting step of detecting a present head position from a signal generated in the reading step;
a write-permission determining step of inferring a next head position from a present position and a previous head position detected in the past, determining that data-writing is permitted, when the present head position and the next head position fall within a predetermined write-prohibiting slice, determining that the data-writing is prohibited, when the present head position and the next head position fall outside the predetermined write-prohibiting slice, and decreasing the write-prohibiting slice while the data-writing is prohibited;
a data-writing step of writing data in accordance with a decision made in the write-permission determining step; and
a head-driving step of driving the head in accordance with the present head position.

11. The method of controlling a magnetic disk, according to claim 10, wherein, in the head-driving step, a servo band and some other parameters are increased to perform a retry operation when the data-writing fails.

12. A method of controlling a magnetic disk, comprising:
a reading step of reading servo information;
a servo-information detecting step of detecting a present head position from a signal generated in the reading step;
a write-permission determining step of inferring a next head position from a present head position and a previous head position detected in the past, determining that data-writing is permitted, when the present head position and the next head position fall within a predetermined write-prohibiting slice, and determining that the data-writing is prohibited, when the present head position and the next head position fall outside the predetermined write-prohibiting slice;
a data-writing step of writing data in accordance with a decision made in the write-permission determining step; and
a head-driving step of driving the head in accordance with the present head position and increasing or decreasing a servo band to perform a retry operation when the data-writing fails.

13. A computer-readable medium storing a program for controlling a magnetic disk designed to make a computer control a magnetic disk to write data when a prescribed condition is satisfied, said program comprising the steps of:

a reading step of reading servo information;

a servo-information detecting step of detecting a present head position from a signal generated in the reading step;

a write-permission determining step of calculating a present head speed and a present head acceleration from the present head position and a previous head position detected in the past, and determining whether data can be written, from the present head position, a present head speed and a present head acceleration;

a data-writing step of writing data in accordance with a decision made in the write-permission determining step; and a head-driving step of driving the head in accordance with the present head positions, wherein, in the write-permission determining step, the present head speed and the present head acceleration are calculated from the present head position, the last head position and the penultimate head position, the present head position, present head speed and present head acceleration are factored in, thereby inferring a next head position, it is determined that data-writing is permitted, when the present head position and the next head position fall within a predetermined write-prohibiting slice, and it is determined that the data-writing is prohibited, when the present head position and the next head position fall outside the predetermined write-prohibiting slice.

14. The computer-readable medium according to claim 13, wherein, in the write-permission determining step, the write-prohibiting slice is decreased while the data-writing is prohibited.

15. The computer-readable medium according to claim 13, wherein, in the head-driving step, a servo band and some other parameters are increased to perform a retry operation when the data-writing fails.

16. A computer-readable medium storing a program for controlling a magnetic disk designed to make a computer control a magnetic disk to write data when a prescribed condition is satisfied, said program comprising the steps of:

a reading step of reading servo information;

a servo-information detecting step of detecting a present head position from a signal generated in the reading step;

a write-permission determining step of inferring a next head position from a present head position and a previous head position detected in the past, determining that data-writing is permitted, when the present head position and the next head position fall within a predetermined write-prohibiting slice, determining that the data-writing is prohibited, when the present head position and the next head position fall outside the predetermined write-prohibiting slice, and decreasing the write-prohibiting slice while the data-writing is prohibited;

a data-writing step of writing data in accordance with a decision made in the write-permission determining step; and a head-driving step of driving the head in accordance with the present head position.

17. The computer-readable medium according to claim 16, wherein, in the head-driving step, a servo band and some other parameters are increased to perform a retry operation when the data-writing fails.

18. A computer-readable medium storing a program for controlling a magnetic disk designed to make a computer control a magnetic disk to write data when a prescribed condition is satisfied, said program comprising the steps of:

a reading step of reading servo information;

a servo-information detecting step of detecting a present head position from a signal generated in the reading step;

a write-permission determining step of inferring a next head position from a present head position and a previous head position detected in the past, and determining that data-writing is permitted, when the present head position and the next head position fall within a predetermined write-prohibiting slice, and determining that the data-writing is prohibited, when the present head position and the next head position fall outside the predetermined write-prohibiting slice;

a data-writing step of writing data in accordance with a decision made in the write-permission determining step; and a head-driving step of driving the head in accordance with the present head position and increasing or decreasing a servo band to perform a retry operation when the data-writing fails.

* * * * *